Patented Nov. 19, 1929

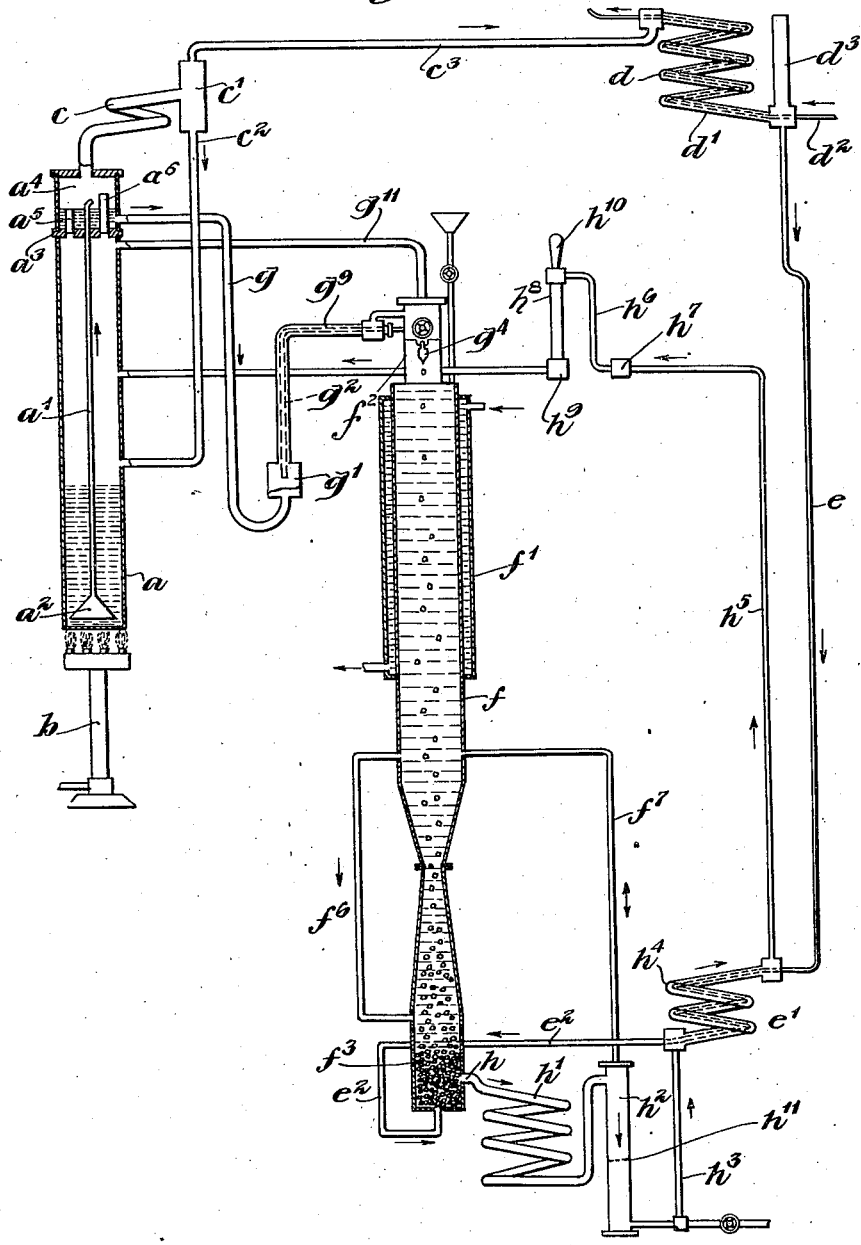

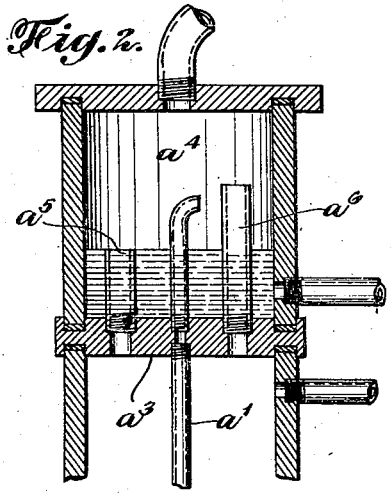
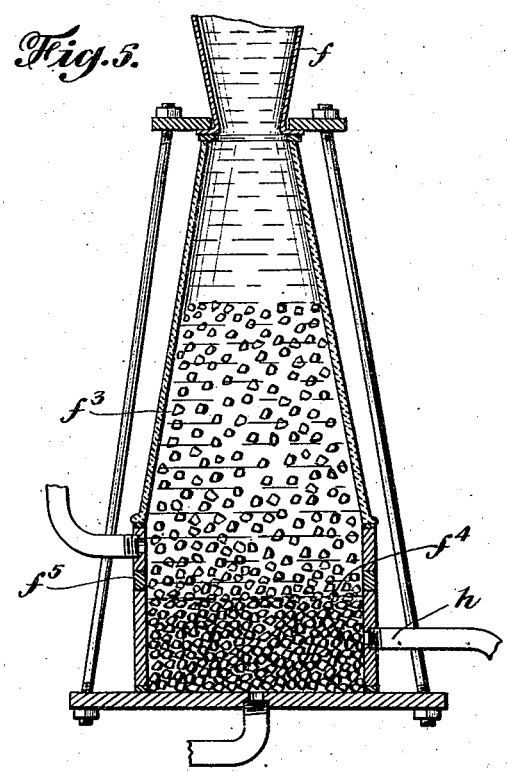
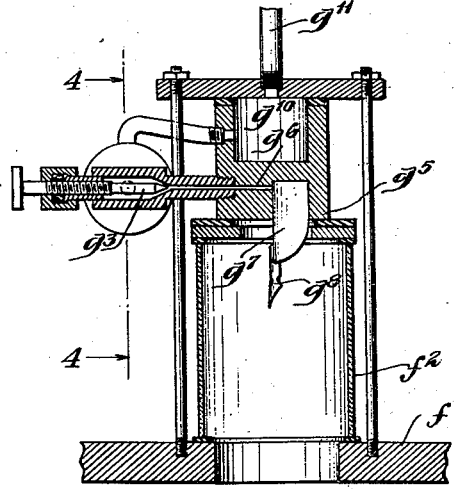
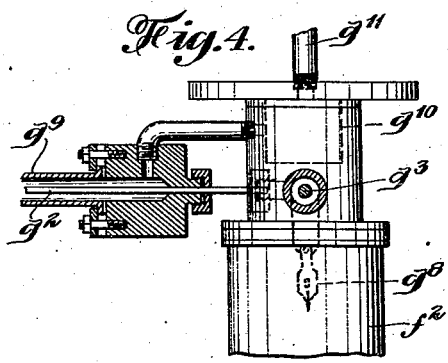

1,735,869

UNITED STATES PATENT OFFICE

DONALD B. KNIGHT, OF BROOKLYN, NEW YORK

REFRIGERATION

Application filed January 26, 1927. Serial No. 163,635.

This invention relates generally to the practice of refrigeration through the absorption of heat in the process of solution of a relatively dry, granular or crystalline substance, such as a salt, in a solvent. In Letters Patent of the United States No. 1,541,968, dated June 16, 1926, there is described a refrigerating apparatus in which refrigeration by the method referred to can be carried on continuously and automatically, with practically no loss either of the substance to be dissolved or of the solvent and without manual intervention after the apparatus has been charged with the salt and the solvent and operation has been initiated. That apparatus, however, designed as described and shown in that patent, embodied a pump for the delivery of the solution from the tank in which the solution of the salt in the solvent takes place, with accompanying absorption of heat from the refrigerating chamber in which the tank is placed, to the evaporator in which the solution is concentrated, the salt and the solvent being separated and returned separately to the brine tank, where the process of solution goes on continuously.

In the further development of that apparatus and of the process carried on therein, it has been found possible, through the application of the present invention, to dispense with the pump and to produce an apparatus which has no moving parts and in which the process is carried on continuously and automatically, with no external means other than a source of heat by which the concentration of the solution is accomplished and, it may be, a supply of cooling water. In the practice of the present invention circulation is dependent mainly upon the difference in specific gravity between the solvent and the solution and may be dependent thereon altogether in installations in which the total height of the apparatus is not a controlling factor. In installations in which height is a controlling factor, an air lift, operated by the source of heat provided for concentration of the solvent, performs the function of maintaining circulation, which would otherwise be performed by added height. In the apparatus shown in said patent the crystallization of the concentrated solution is effected by the cooling of the concentrated solution to or below the temperature at which crystallization takes place, by letting the concentrated solution trickle down through a vessel or tube which was cooled externally, an agitator being provided to bring the saturated solution and the salt as it lost its water into contact with the cold wall of the tube or vessel, the agitator being another moving part.

In accordance with the present invention the crystallization of the salt is effected more satisfactorily and economically by permitting the solution to pass in drops or globules through a cooling medium which is immiscible with water, the drops or globules of the hot saturated solution hardening in their passage into the form of pellets in readiness for solution in the solvent. The method in which the present invention finds expression is mainly characterized by one or the other or both of the novel features above referred to, while the apparatus in which it also finds expression is characterized by features essential to the performance of the method as indicated above and by other features found desirable in the practical application of the invention.

The invention will be described more fully hereinafter with reference to the accompanying drawings in which it is illustrated as embodied in a suitable structure and in which:

Figure 1 is a view partially in elevation and partially in vertical section, and somewhat diagrammatic, of such an apparatus.

Figure 2 is a detail view in sectional elevation and on a larger scale of the upper part of the concentrator.

Figure 3 is a detail view in sectional elevation of the dropper at the upper end of the crystallizer and its associated parts.

Figure 4 is a view in sectional elevation of some of the parts shown in Figure 3, as seen from the right-hand.

Figure 5 is a detail view in sectional elevation on a larger scale of the lower portion of the crystallizer.

In describing the improved method of refrigeration and the apparatus in which it is carried on, it will be convenient to assume that the solution of the salt in the solvent has reached the boiler or concentrator $a$ which has associated with it a source of heat $b$ suitable for evaporation of the solution. In the embodiment of the invention illustrated, it is assumed that the height at which the concentrator is to be placed is limited by considerations of convenience and the concentrator is therefore shown as provided with an air or steam lift, which may consist of a tube $a'$ with a flaring mouth $a^2$ at its lower end and extended through and above a partition $a^3$ near the upper end of the concentrator. Such a lift operates in usual manner to raise liquid, that is, the concentrated solution, from the lower part of the concentrator to the small chamber $a^4$ formed above the partition or diaphragm $a^3$. Pipe $a^5$, threaded into the diaphragm $a^3$, determines the height at which the concentrated solution may stand in the chamber $a^4$, and the pipe $a^6$ permits the passage of the steam from the concentrator. The steam from the hot, concentrated solution passes from the chamber $a^4$ through a rectifier, which may consist of a coil $c$ and a separating vessel $c'$, in which there is separated from the steam any liquid which may be carried over with it the form of froth or otherwise. Such separated liquid may be returned to the concentrator $a$ through a pipe $c^2$, while the steam is conducted through a pipe $c^3$ to a condenser $d$, which may consist of a coiled pipe $d'$ with an internal pipe $d^2$ connected to a suitable source of cooling water. Associated with the condenser is an air-release $d^3$, consisting, it may be, of a vertical pipe open at its top, for the purpose of releasing non-condensing gases, or air, and thus preventing back pressure in the system through accumulation of such gases or air.

A pipe $e$ serves to conduct the water of condensation from the condenser $d$ through a heat exchanger $e'$ and a pipe $e^2$ to the bottom of the crystallizer $f$, which may consist of a vertical vessel, preferably shaped somewhat as shown, and preferably provided about its upper portion with a cooling shaft $f'$, to which cooling water may be supplied from any suitable source.

This crystallizer is filled with a cooling medium, such as a mixture of carbon tetrachloride and oil, which is immiscible with water. The precise nature of the cooling medium may be determined by convenience and the nature of the salt and solvent employed. It has been found that under the conditions of operation followed hitherto a mixture of carbon tetrachloride and oil in such proportions as to give a specific gravity of about 1.0000, gives satisfactory results.

The hot, saturated solution from the chamber $a^4$ of the concentrator $a$ is conducted through a trapped pipe $g$ to the crystallizer. The pipe $g$ delivers the hot solution into a small chamber $g'$ from which a determined portion passes through a small inner pipe $g^2$ to a dropper at the head of the crystallizer, the flow of the solution being controlled by a needle valve $g^3$. The dropper $g^4$ is formed in any suitable manner to permit drops or globules of the hot, saturated solution to pass into the crystallizer in order that each drop or globule may be cooled in its passage through the cooling medium in the crystallizer to a temperature to or below that at which crystallization of the salt will take place. As shown, the dropper consists of a block $g^5$ in which is drilled a small duct $g^6$ by which the solution is led from the regulating valve $g^3$ to the inside of the tubular shield $g^7$, seated in a recess formed in the under-side of the block and provided with a pointed extension $g^8$. In this device the solution trickles down on the inside of the sheet metal shield $g^7$ and falls from the point $g^8$ in successive drops which fall through the space left within the glass shield $f^2$ mounted at the top of the crystallizer $f$, into the cooling medium with which the crystallizer is filled practically to the top.

In order that the circulation of the liquids in the apparatus shall not be checked by the cooling of the hot solution between the concentrator and the dropper, and consequent crystallization in the conductor, a surplus of the hot solution is delivered from the concentrator through the pipe $g$ and such surplus is conducted from the chamber $g'$ through an external pipe $g^9$ which jackets the small pipe $g^2$ and delivers the hot solution to the chamber $g^{10}$ above the dropper, from which chamber the surplus is conducted through a pipe $g^{11}$ back to the concentrator $a$ at a point below the diaphragm $a^3$. The volume of the surplus solution thus conducted is sufficient to prevent cooling and crystallization in the small pipe $g^2$ and in the dropper $g^4$.

As each drop of the hot concentrated solution falls from the dropper into the immiscible cooling medium in the crystallizer, it quickly solidifies and descends to the dissolver or bottom part $f^3$ of the crystallizer, the pellets accumulating in the dissolver where they are met and dissolved by the already cooled water of condensation, admitted through the pipe $e^2$. The cold solution thus formed has a higher specific gravity than the cooling medium in the crystallizer and keeps the cooling medium somewhat above the bottom of the dissolver, as indicated by a line of separation at $f^4$. This line of separation varies more or less under different conditions of operation of the apparatus, but the apparatus is so proportioned that it will stand always above the outlet at $h$ from which the cold solution is conducted through a suitable coil $h'$ which is suitably located in the refrigerating chamber indicated generally at $h^2$. From the cooling coil $h'$ the solution, having absorbed heat but still cold, passes through a trap $h^2$, which may consist of a vertical cylinder in which may be placed a quantity of the cooling medium and in which the cooling medium is displaced by the cold solution then of greater specific gravity. From the trap $h^2$ the cold solution passes through a pipe $h^3$, the external pipe $h^4$ of the heat exchanger $e^3$ and the pipe $h^5$ back to the concentrator $a$ at a point below the diaphragm $a^3$. For the purpose of varying somewhat the height of the column of liquid between the bottom of the trap $h^2$ and the point of return of the solution to the concentrator, if such variation should at any time be necessary, there may be interposed in the pipe $h^5$ a pressure adjusting device, which is shown as comprising a pipe section $h^6$, swiveled to the pipe $h^5$, as at $h^7$, and communicating with a pipe $h^8$ which is also swiveled to the pipe $h^6$, as indicated at $h^9$ and is provided with a handle, as at $h^{10}$. By swinging this adjuster between the horizontal and vertical positions the pressure head of the column of liquid in the pipe $h^5$ between the trap $h^2$ and the highest point of the adjuster can be varied to some extent.

In order that the temperature in the dissolver may be affected as little as possible through conduction of heat by the wall of the crystallizer, it is desirable to introduce a heat insulator, as indicated at $f^5$, between the walls of the crystallizer and the dissolver. It is also desirable to provide a connection, as at $f^6$, between the upper part of the dissolver $f^3$ and the lower part of the crystallizer $f$, to permit the cooling medium to circulate through the crystals or pellets of salt in the upper part of the dissolver, in order that the crystals or pellets may be thoroughly cooled before they settle into the lower part of the dissolver where they come in contact with the solvent. It is also desirable to provide a connection $f^7$ between the upper part of the trap $h^2$ and the lower part of the crystallizer in order to permit movement of the cooling medium between the trap and the lower part of the crystallizer to accommodate the displacement of the cooling medium in the trap $o$ through variation in the accumulation of crystals or pellets in the dissolver.

In the practice of refrigeration in accordance with the present invention, the movements of the liquids, that is, of the solution and the solvent, are due to changes in specific gravities brought about in the operation. The weights of the columns of liquid are balanced and the elevation of the hot, concentrated solution, whether by elevation of the concentrator itself or by the air-lift provided for the purpose of making unnecessary the elevation of the concentrator, is for the purpose of maintaining the balance of weights of the columns of liquid and not for the purpose of creating hydrostatic head. If absorption of heat in the refrigerating chamber has proceeded to the maximum and no movement of the liquids takes place for a time, it will be evident that evaporation of the solution in the concentrator proceeds and the specific gravity of the liquid increases because the evaporated solvent is not replaced by added solvent. The column of liquid between the top of the concentrator and the dropper is increased in weight and flow of the hot concentrated solution takes place at the dropper. The steam generated in the concentrator during the application of heat passes off continuously through the rectifier $c$, the pipe $c^3$ and the condenser $d$, so that the flow of water of condensation through the pipe $e$, the heat exchanger $e'$ and the pipe $e^2$, into the bottom of the dissolver $f^3$ is constant. In the event, therefore, of any cessation of the flow of the hot, concentrated solution through the dropper into the crystallizer, the accumulation of the crystallized pellets in the lower part of the dissolver becomes less through the action of the solvent matter. As the crystallized pellets descend out of the cooling liquid into the bottom of the dissolver, the displacement of the cooling liquid by the crystallized pellets in the upper part of the dissolver becomes less and the line of demarkation, indicated at $h^{11}$ in the trap $h^2$, between the heavier, cold solution which descends to the bottom and the lighter cooling medium which, supplied through the pipe $f^7$, stands in the upper part of the trap, rises somewhat in the trap $h^2$. Obviously, when the displacement of the cooling medium in the dissolver is lessened, the cooling medium sinks slightly in the crystallizer, creating a slight negative pressure in the air space at the top of the crystallizer, and therefore promoting the flow of the hot, concentrated solution from the dropper, with a consequent increase in the quantity of crystallized pellets in the dissolver. On the other hand, as will be evident, accumulation of the crystallized pellets in the dissolver, displaces the cooling medium, causes it to rise in the crystallizer, and increases the pressure in the air space at the top of the crystallizer, thereby retarding the flow of the hot, concentrated solution from the dropper. The trap formed by the pipes $g$, $g'$, prevents the escape of air from the air chamber $f^2$ at the top of the crystallizer and so prevents the upsetting of the balance and the desirable decrease and increase in the pressure in the chamber which contribute to the automatic operation of the apparatus.

Reference has been made to the balance maintained between the columns of liquid in the apparatus. This balance is maintained under the operation of that law of hydrostatics in accordance with which two columns of liquid have the same pressure per square inch at their bases when the height of one column multiplied by the specific gravity of the liquid which it contains, equals the height of the other column multiplied by the specific gravity of the liquid in it. With this foundation, the specific gravity of the hot, concentrated solution being known, say at 1.400, and the specific gravity of the solution returned to the concentrator being known, say 1.245, with the specific gravity of the cooling medium taken at 1.000, it is simply a matter of calculation to determine the height to which the hot, concentrated solution must be raised, if no air lift is provided, or the height through which it must be raised by the air lift, in order that there may be a balance between the column of hot, concentrated solution and the column of cold solution returned from the bottom of the dissolver to the concentrator. With a total height of the crystallizer of thirty-six inches from the bottom of the dissolver to the air space at the top, and an air space of three inches, it can be shown that without the air lift the total height from the bottom of the crystallizer and dissolver to the highest point at which the hot, concentrated solution leaves the concentrator, must be about eleven feet. By employing an air lift, as shown, with a lifting capacity of about four inches, the desired balance can be secured with a total height of the appartaus of about seven feet.

Reference has been made herein to a salt as the material to be dissolved and to water as the solvent, but it will be understood that these terms are used as generic terms, the salt being any solid or crystalline substance suitable for use and the solvent being any solvent suitable for use with the selected salt.

It will be obvious that various modifications can be made in the apparatus to suit different conditions of use and that the invention, therefore, except as pointed out in the accompanying claims, is not restricted to the particular construction and arrangement of apparatus herein described.

I claim as my invention:

1. The process of refrigeration by the solution of a salt in a solvent, which consists in concentrating a salt solution, crystallizing the salt out of the solution, dissolving the salt in the solvent, returning the solution for concentration, and maintaining a balance of weight between the column of concentrated solution and the column of returning solution, movement of the solutions in the two columns being dependent upon the difference in specific gravities of the two solutions.

2. The process of refrigeration by the solution of a salt in a solvent, which consists in concentrating a salt solution, crystallizing the salt out of the solution, dissolving the salt in the solvent, returning the solution for concentration, applying heat to the solution to concentrate the same and passing the hot, concentrated solution in relatively small portions through a cooling medium immiscible with the solvent to effect cooling of the small bodies of solution below the point of crystallization and the hardening of the same into masses of salt for further solution.

3. A refrigerating apparatus of the character described, comprising a refrigerating device in which the cold solution is received for the absorption of heat, a concentrator, a crystallizer and dissolver to receive an immiscible cooling medium and in which the salt is crystallized out of the solution by reduction in temperature and is received in the dissolver for further solution, means including a dropper to deliver the concentrated solution from the concentrator to the crystallizer in drops, and means to return the solution from the dissolver to the concentrator, the crystallizer and dissolver being arranged as a vertically disposed vessel with an air chamber at the top and a trap being interposed in the connection between the concentrator and the dropper to prevent the escape of air from the air space.

4. A refrigerating apparatus of the character described, comprising a refrigerating device in which the cold solution is received for the absorption of heat, a concentrator, a crystallizer and dissolver to receive a cooling medium, in which refrigerating device the salt is crystallized out of the solution by reduction in temperature and is received in the dissolver for further solution, means to supply solvent to the dissolver, means to deliver the concentrated solution from the concentrator to the crystallizer and dissolver, and means to return the solution from the dissolver to the concentrator, the crystallizer and dissolver being arranged as a vertically disposed vessel, and a by-pass connection being provided between the upper part of the dissolver and the lower part of the crystallizer to permit circulation of the cooling medium.

5. A refrigerating apparatus of the character described, comprising a refrigerating device in which the cold solution is received for the absorption of heat, a concentrator, a crystallizer and dissolver to receive a cooling medium, in which refrigerating device the salt is crystallized out of the solution by reduction in temperature and is received in the dissolver for further solution, means to supply solvent to the dissolver, means to deliver the concentrated solution from the concentrator to the crystallizer and dissolver, and means to return the solution from the dissolver to the concentrator, a trap being interposed between the refrigerating device and the means to return a solution to the concentrator, and a by-pass connection being provided between the upper part of the trap and the crystallizer to permit movement of the cooling medium.

6. A refrigerating apparatus of the character described, comprising a refrigerating device in which the cold solution is received for the absorption of heat, a concentrator, a crystallizer and dissolver to receive a cooling medium, in which refrigerating device the salt is crystallized out of the solution by reduction in temperature and is received in the dissolver for further solution, means to supply solvent to the dissolver, means to deliver the concentrated solution from the concentrator to the crystallizer and dissolver, and means to return the solution from the dissolver to the concentrator, the concentrator being formed as a vertical vessel above a source of heat and with a chamber in its upper end to which is connected the means to deliver the solution to the crystallizer and an air lift being included to raise the solution in the concentrator to said chamber.

This specification signed this 20th day of January A. D. 1927.

DONALD B. KNIGHT.